(12) United States Patent
Hato et al.

(10) Patent No.: US 9,847,927 B2
(45) Date of Patent: Dec. 19, 2017

(54) INFORMATION PROCESSING DEVICE, METHOD, AND MEDIUM

(71) Applicant: PFU Limited, Kahoku-shi, Ishikawa (JP)

(72) Inventors: Itsufumi Hato, Kahoku (JP); Kouichi Yamashita, Kahoku (JP); Kazuhiro Koide, Kahoku (JP)

(73) Assignee: PFU LIMITED, Ishikawa (JP)

( * ) Notice: Subject to any disclaimer, the term of this patent is extended or adjusted under 35 U.S.C. 154(b) by 217 days.

(21) Appl. No.: 14/683,411

(22) Filed: Apr. 10, 2015

(65) Prior Publication Data

US 2016/0191368 A1    Jun. 30, 2016

(30) Foreign Application Priority Data

Dec. 26, 2014   (JP) ................................ 2014-265805

(51) Int. Cl.
  *H04L 12/26*   (2006.01)
  *H04L 12/803*  (2013.01)

(52) U.S. Cl.
  CPC ............ *H04L 43/12* (2013.01); *H04L 43/026* (2013.01); *H04L 47/125* (2013.01)

(58) Field of Classification Search
  None
  See application file for complete search history.

(56) References Cited

U.S. PATENT DOCUMENTS

| | | | | |
|---|---|---|---|---|
| 6,831,893 | B1 * | 12/2004 | Ben Nun | H04L 29/06 370/229 |
| 2006/0056406 | A1 * | 3/2006 | Bouchard | H04L 12/56 370/389 |
| 2006/0059221 | A1 | 3/2006 | Carlson | |
| 2006/0059286 | A1 | 3/2006 | Bertone et al. | |
| 2006/0059310 | A1 | 3/2006 | Asher et al. | |
| 2006/0059314 | A1 | 3/2006 | Bouchard et al. | |
| 2006/0059316 | A1 | 3/2006 | Asher et al. | |
| 2006/0069872 | A1 | 3/2006 | Bouchard et al. | |
| 2006/0075119 | A1 | 4/2006 | Hussain et al. | |
| 2006/0075206 | A1 | 4/2006 | Bouchard et al. | |
| 2006/0085533 | A1 | 4/2006 | Hussain et al. | |
| 2006/0095741 | A1 | 5/2006 | Asher et al. | |
| 2007/0038798 | A1 | 2/2007 | Bouchard et al. | |
| 2010/0023626 | A1 | 1/2010 | Hussain et al. | |
| 2010/0322104 | A1 * | 12/2010 | Kanekar | H04L 63/166 370/254 |
| 2010/0322252 | A1 | 12/2010 | Suganthi et al. | |
| 2014/0032607 | A1 | 1/2014 | Hussain et al. | |
| 2014/0317353 | A1 | 10/2014 | Asher et al. | |
| 2014/0337387 | A1 | 11/2014 | Hussain et al. | |

FOREIGN PATENT DOCUMENTS

JP    2008-512950 A    4/2008

* cited by examiner

*Primary Examiner* — Jason Mattis
*Assistant Examiner* — James P Duffy
(74) *Attorney, Agent, or Firm* — Westerman, Hattori, Daniels & Adrian, LLP

(57) ABSTRACT

In an information processing device in which analysis of a received packet is distributed to a plurality of cores, each core determines whether or not the core is appropriate as a core for analyzing the distributed packet, and when it is determined that the core is not appropriate, the core records request information for requesting another core to analyze the packet in a shared memory.

10 Claims, 10 Drawing Sheets

INFORMATION PROCESSING DEVICE, METHOD, AND MEDIUM

CROSS-REFERENCE TO RELATED APPLICATION

This application is based upon and claims the benefit of priority of the prior Japanese Patent Application No. JP2014-265805, filed on Dec. 26, 2014, the entire contents of which are incorporated herein by reference.

FIELD

The present disclosure relates to a technique for processing a reception packet by distributing the reception packet to a plurality of cores.

BACKGROUND

Conventionally, network service processors are proposed which, as a plurality of independent network service processors, dynamically schedule pieces of work to be executed in parallel by processors based on tags of the pieces of work so that execution of the pieces of works is sequenced and synchronized (refer to Japanese Translation of PCT Application No. 2008-512950).

In addition, a technique for rewriting port numbers in order to process a plurality of connections with a plurality of cores has been proposed (refer to US Patent No. 2010/0322252 (Specification)).

SUMMARY

An example of the present disclosure is an information processing device including a plurality of processing units capable of running in parallel, a memory shared by the plurality of processing units, and a distributing unit that distributes analysis of a received packet to any of the processing units based on information included in the packet, each of the plurality of processing units including: management information recording means for recording, in the memory, management information enabling a relationship to be determined, the relationship between a communication connection and a processing unit in charge of analysis of a packet related to the communication connection; determining means for determining whether or not its own processing unit is appropriate as a processing unit for analyzing the packet distributed by the distributing unit by referring to the management information; analyzing means for analyzing the packet distributed by the distributing unit when it is determined that its own processing unit is appropriate as a processing unit for analyzing the packet; request information recording means for recording request information for requesting another processing unit to perform analysis of the packet distributed by the distributing unit when it is determined that its own processing unit is not appropriate as a processing unit for analyzing the packet; and specifying means for specifying a packet related to request information intended for its own processing unit by referring to the memory, wherein the analyzing means further analyzes the packet specified by the specifying means.

The present disclosure may be viewed as an information processing device, a system, a method that is executed by a computer, and a program to be run on a computer.

In addition, the present disclosure may be viewed as a recording of such a program on a recording medium that is readable by a device such as a computer, a machine, or the like.

In this case, a recording medium that is readable by a computer or the like refers to a recording medium which stores information such as data and programs by an electric action, a magnetic action, an optical action, a mechanical action, or a chemical action and which can be read by a computer or the like.

DESCRIPTION OF EMBODIMENTS

Hereinafter, an embodiment of an information processing device, a method, and a program according to the present disclosure will be described with reference to the drawings.

It should be noted that the embodiment described below merely exemplifies the present disclosure and is not intended to limit an information processing device, a method, and a program according to the present disclosure to the specific configuration described below. When implementing the present disclosure, a specific configuration may be adopted as appropriate in accordance with each embodiment. In addition, various improvements and modification may be made to the present disclosure.

As the present embodiment, an embodiment in which an information processing device, a method, and a program according to the present disclosure are implemented in a system for monitoring a network will be described. However, an information processing device, a method, and a program according to the present disclosure can be widely used with respect to techniques for processing a reception packet by distributing the reception packet to a plurality of cores. Accordingly, objects of application of the present disclosure are not limited to the examples described in the present embodiment.

<Configuration of System>

Figure 1:
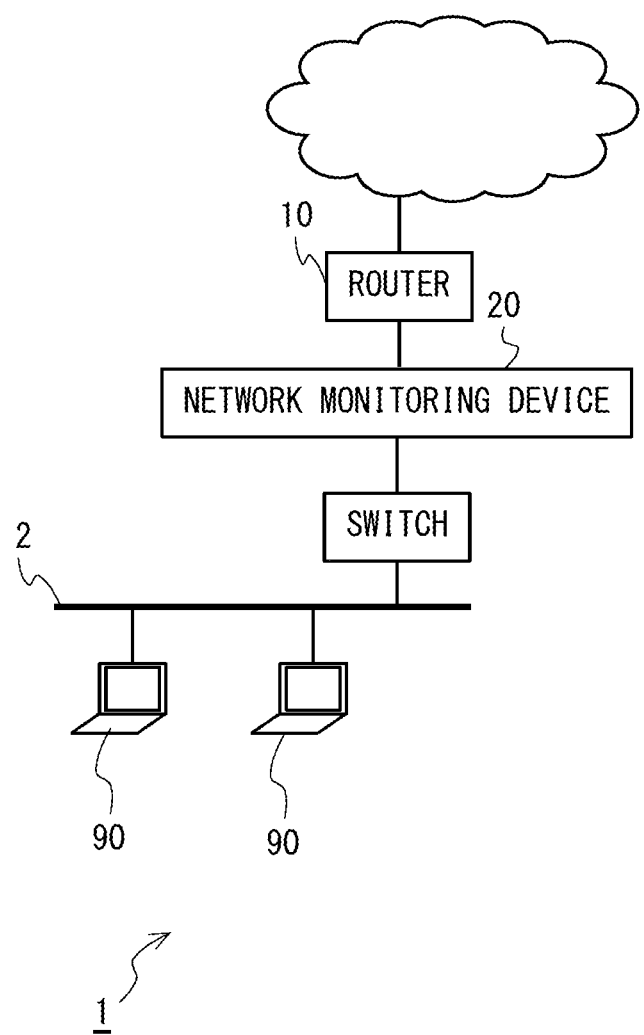
FIG. 1 is a schematic diagram showing a configuration of a system according to an embodiment.

FIG. 1 is a schematic diagram showing a configuration of a system 1 according to the present embodiment. The system 1 according to the present embodiment includes a network segment 2 to which a plurality of information processing terminals 90 (hereinafter, referred to as "nodes 90") are connected and a network monitoring device 20 for monitoring communication related to the nodes 90. In addition, the nodes 90 in the network segment 2 are capable of communicating, via a router 10, with various servers connected at remote locations via the Internet or wide area networks. In the present embodiment, the network monitoring device 20 acquires packets, frames, and the like which pass through the network monitoring device 20 by being connected between a switch or a router (the router 10 in the example shown in FIG. 1) of the network segment 2 and another switch or router that is hierarchically above the switch or the router of the network segment 2. In this case, the network monitoring device 20 runs in an in-line mode in which packets that need not be blocked among acquired packets are transferred.

Figure 2:
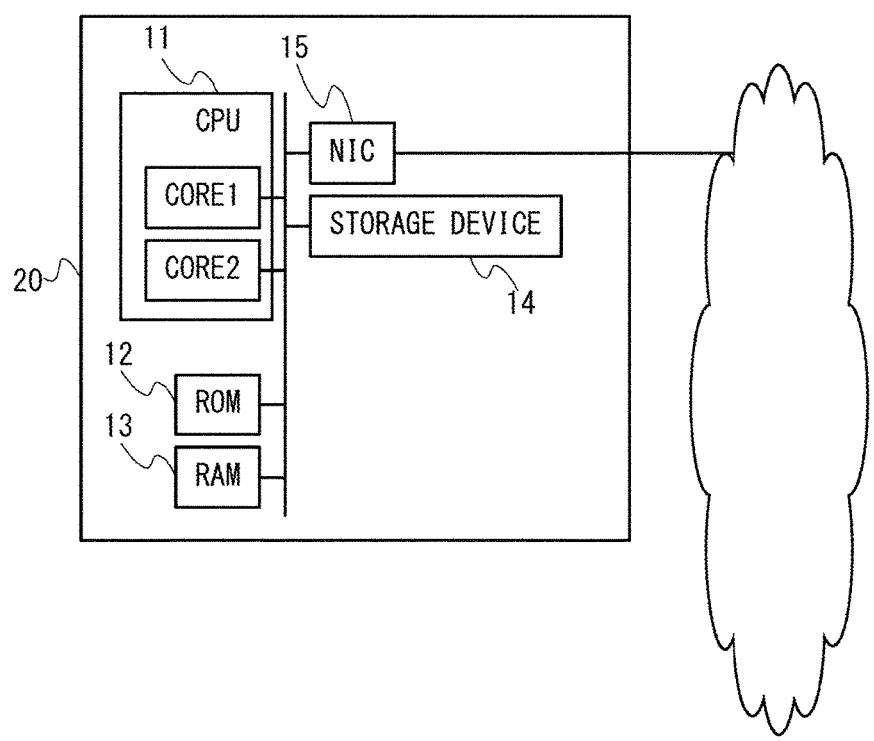
FIG. 2 is a diagram showing a hardware configuration of a network monitoring device according to an embodiment.

FIG. 2 is a diagram showing a hardware configuration of the network monitoring device 20 according to the present embodiment. It should be noted that, in FIG. 2, components other than the network monitoring device 20 (the router 10, the nodes 90, and the like) have been omitted. The network monitoring device 20 is a computer including a central processing unit (CPU) 11, a Random access memory (RAM) 13, a Read Only Memory (ROM) 12, a storage device 14 such as an electrically erasable and programmable Read only memory (EEPROM), a hard disk drive (HDD), or the like, a communicating unit such as an network interface card (NIC) 15, and the like.

In this case, the CPU 11 is a multi-core CPU having a plurality of cores (processing units). While a dual-core (core 1 and core 2) CPU will be described as an example in the present embodiment, the number of cores is not limited to that described in the present disclosure. In addition, the RAM 13 is shared by the plurality of cores. Therefore, among the areas of the RAM 13, areas that may potentially be accessed by the plurality of cores require exclusive control.

Figure 3:
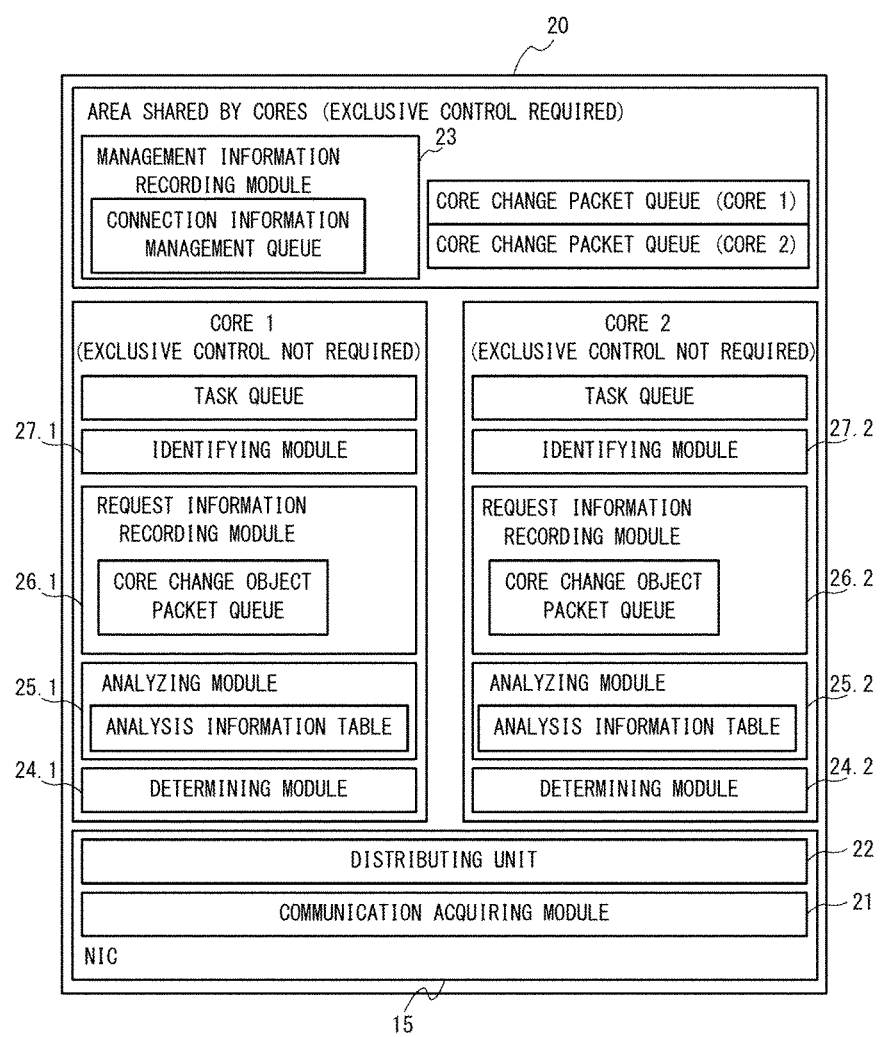
FIG. 3 is a diagram showing an outline of a functional configuration of a network monitoring device according to an embodiment.

FIG. 3 is a diagram showing an outline of a functional configuration of the network monitoring device 20 according to the present embodiment. By having a program recorded in the storage device 14 be read out to the RAM 13 and executed by the CPU 11, the network monitoring device 20 functions as an information processing device including a communication acquiring module 21, a distributing unit 22, a management information recording module 23, determining modules 24.1 and 24.2 (when referring to any one of the determining modules, the determining modules will be simply described as the "determining module 24"), analyzing modules 25.1 and 25.2 (when referring to any one of the analyzing modules, the analyzing modules will be simply described as the "analyzing module 25"), request information recording modules 26.1 and 26.2 (when referring to any one of the request information recording modules, the request information recording modules will be simply described as the "request information recording module 26"), and identifying modules 27.1 and 27.2 (when referring to any one of the identifying modules, the identifying modules will be simply described as the "identifying module 27"). Moreover, in the present embodiment, the respective functions of the network monitoring device 20 are executed by the CPU 11 that is a general purpose processor. Alternatively, a part of or all of the functions may be executed by one or a plurality of dedicated processors. In addition, a part of or all of the functions may be executed by a device installed at a remote location or by a plurality of devices installed in a distributed manner using cloud technology or the like.

An NIC 15 functions as the communication acquiring module 21 and the distributing unit 22.

The communication acquiring module 21 acquires a packet transmitted and/or received by a terminal connected to the network and records the acquired packet in the RAM 13. Moreover, in the present embodiment, "terminals" to be an object of monitoring and detection by the network monitoring device 20 include the nodes 90 connected to the network segment 2 as well as other devices (nodes belonging to other networks, external servers, and the like) that communicate with the nodes 90 via the router 10.

The distributing unit 22 distributes analysis of a reception packet based on information included in the received packet. The distributing unit 22 decides a core to which the received packet is to be distributed according to a result of a hash operation performed on information including at least any of a transmission source address, a destination address, a transmission source port number, a destination port number, and a protocol number (a so-called 5-tuple) included in the packet. In addition, the distributing unit 22 distributes the packet by notifying an address of the packet that is recorded in the RAM 13 to any of the cores. Since a hash operation of a same algorithm is applied to all packets, packets having a same 5-tuple are to be distributed to a same core. Accordingly, by referring to an analysis information table of an area that is accessible by each core without having to perform exclusive control, each core can analyze packets belonging to a same connection. However, the use of a hash operation on a 5-tuple as a distribution method is simply an example and other algorithms may be adopted as the algorithm to be used for distribution.

The management information recording module 23 records management information (connection information) enabling a relationship between a communication connection and a core in charge of analysis of a packet related to the communication connection to be determined in a connection information management queue in the RAM 13 to manage connection information. In the present embodiment, as the connection information, a transmission source address, a destination address, transmission source port number, a destination port number, and a protocol number of the connection are managed in association with a core ID of a core in charge of analysis of a packet belonging to the connection. Moreover, since the connection information management queue is an area shared by a plurality of cores to be accessed by the cores, the connection information management queue requires exclusive control among the cores.

When a program deployed on the RAM 13 is executed, each of the plurality of cores that are capable of running in parallel functions as the determining module 24, the analyzing module 25, the request information recording module 26, and the identifying module 27. In addition, in the present embodiment, the plurality of cores run simultaneously to process a plurality of packets in parallel. Upon each reception of a packet belonging to a connection for which each core is in charge, the core analyzes a packet in response to a distribution by the distributing unit 22 regardless of states of other cores.

The determining module 24 determines whether or not its own core is appropriate as a core for analyzing the packet distributed by the distributing unit 22 by referring to the management information. Specifically, the determining module 24 determines that a packet is a packet for which a core in charge of processing must be changed when the packet is any of (1) a packet belonging to a connection after address translation, (2) a packet belonging to a connection with a parent-child relationship, and (3) an error packet of ICMP.

(1) Packet Belonging to Connection after Address Translation

With a connection handling an address translation (a connection for which an IP address or a port number must be replaced upon reception or transmission by the network monitoring device 20), according to a 5-tuple core distribution method, a return packet of the connection subjected to address translation by the present device may potentially be distributed to a core which differs from a core that had processed the connection prior to the address translation. Therefore, in a case of a packet which is distributed to a different core as a result of a change made to any of transmission source/destination IP addresses and transmission source/destination port numbers due to address translation even though the packet belongs to a connection for which another core is in charge, the core in charge is changed so that connections before the address translation and after the address translation can be processed by a same core. In other words, the determining module 24 refers to a connection information management queue, and when connection information is recorded which indicates that another core had performed analysis of the packet of the connection before becoming an object of address translation, the determining module 24 determines that its own core is not appropriate as a core for analyzing the packet.

(2) Packet Belonging to Connection with Parent-Child Relationship

When there are a plurality of connections in a parent-child relationship such as a control connection of FTP (parent) and a data connection of FTP (child), a core change is performed so that packets related to the plurality of connections can be processed by a same core. When starting a file transfer, since actual data communication is a connection that differs from the control connection, at least a port number among a 5-tuple is changed to a different number and packets end up being distributed to a different core. In a case of a packet belonging to a connection in a parent-child relationship with a connection for which another core is in charge, the child connection makes a change to a core that is processing the parent connection. In other words, the determining module 24 refers to a connection information management queue, and when connection information is recorded which indicates that another core had performed analysis of the packet of a connection related to (for example, in a parent-child relationship with) a connection to which the packet belongs, the determining module 24 determines that its own core is not appropriate as a core for analyzing the packet.

(3) Error Packet of ICMP

With an error packet of ICMP (in case of a return packet), a change is made to a core having processed a virtual ICMP connection of an original packet (in case of a request packet) included in the packet. In other words, the determining module 24 refers to a connection information management queue, and when connection information is recorded which indicates that the packet includes a previously transmitted or received packet and that another core had performed analysis of the included packet, the determining module 24 determines that its own core is not appropriate as a core for analyzing the packet.

In addition, by queuing an address (an address in the RAM 13) of a packet for which a determination that a core in charge of processing should be changed has been made to the core change object packet queue, the determining module 24 requests the request information recording module 26 to change the core in charge of processing of the packet. In this case, since the core change object packet queue is an area which is inside a core executing the determining module 24 and which is only accessed by the core, exclusive control among cores is not required.

When it is determined that its own core is appropriate as a core for analyzing the packet distributed by the distributing unit 22, the analyzing module 25 analyzes the packet. In addition, the analyzing module 25 analyzes a packet which is related to a change request issued to its own core by another core and which is identified by the identifying module 27 to be described later. The analyzing module 25 analyzes the packet while referring to an analysis information table and also records a result of the analysis in the analysis information table. In this case, since the analysis information table is an area which is inside a core executing the analyzing module 25 and which is only accessed by the core, exclusive control among cores is not required.

In the present embodiment, since the distributing unit 22 distributes a packet to a core having analyzed a previous packet of a same connection and, even if an error occurs in the distribution by the distributing unit 22, since a core in charge of processing is changed to an appropriate core by the determining module 24, the request information recording module 26, and the like, the analyzing module 25 can analyze a packet by referring to an analysis information table that is only accessed by a core executing the analyzing module 25 without having to refer to analysis information tables of other cores.

When it is determined that its own core is not appropriate as a core for analyzing the packet distributed by the distributing unit 22, the request information recording module 26 records request information (a change request and a packet address) for requesting another core to perform analysis of the packet in a queue provided on the RAM 13. Specifically, by referring to connection information, the request information recording module 26 identifies another core (a change destination core) that is appropriate for analyzing the packet, queues an address of the packet to a core change packet queue (which differs from the core change object packet queue) that is referred to by the change destination core, and queues the change request to a task queue that is referred to by the change destination core. Moreover, since the core change packet queue is an area which is shared by a plurality of cores and which is accessed by the cores, the connection information management queue requires exclusive control among the cores.

The identifying module 27 refers to a core change packet queue on the RAM 13 to identify a packet related to a change request issued to its own core.

<Flow of Processes>

Next, a flow of processes executed by the system 1 according to the present embodiment will be described with reference to flow charts. It is to be understood that specific contents and specific sequences of processes shown in the flow charts described below merely represent one example of implementing the present disclosure. Specific contents and sequences of the processes may be appropriately selected in accordance with embodiments of the present disclosure.

Figure 4:
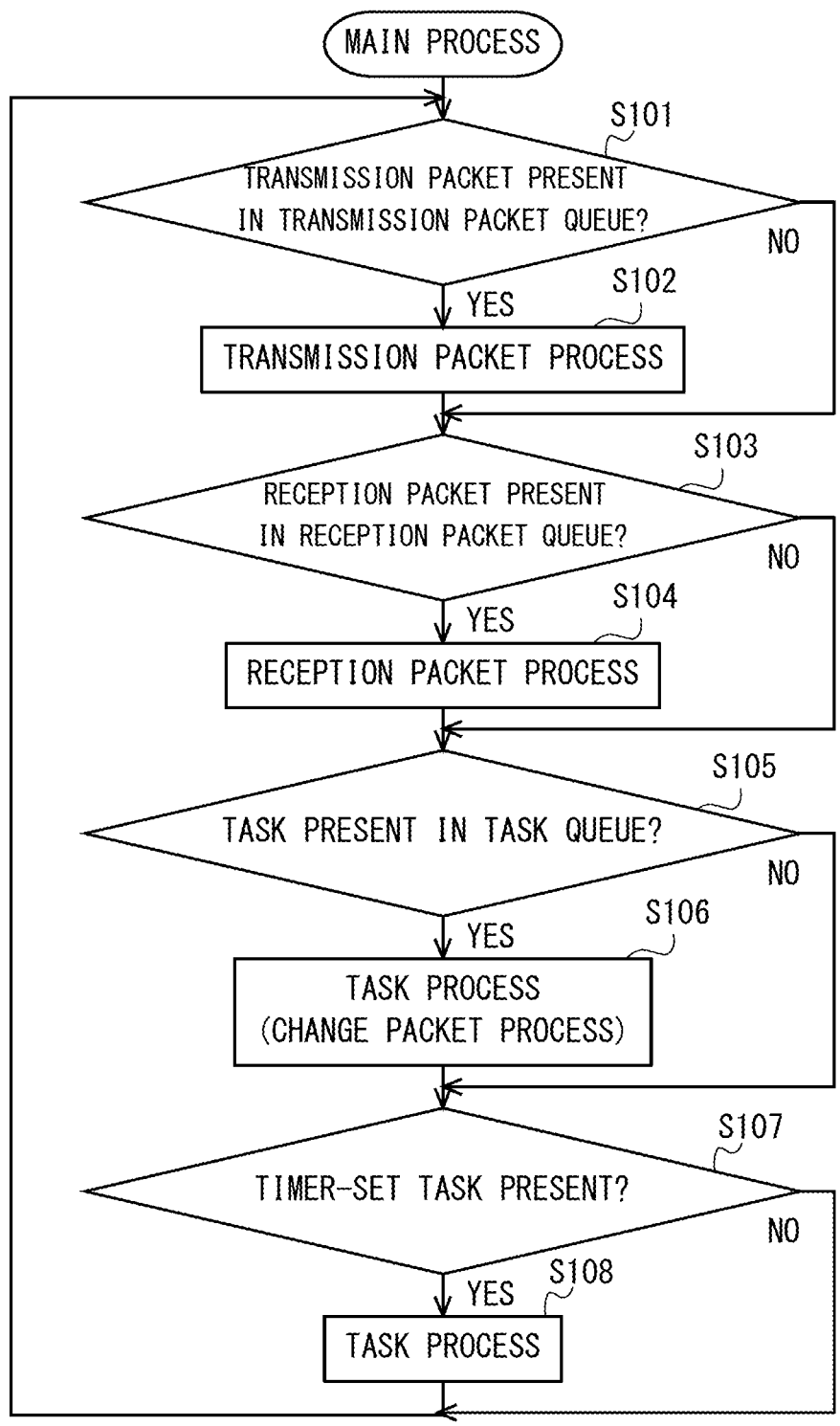
FIG. 4 is a flow chart showing an outline of a flow of a main process according to an embodiment.

FIG. 4 is a flow chart showing an outline of a flow of a main process that is executed by each core according to the present embodiment. The process shown in the present flow chart is repetitively executed by each core after the network monitoring device 20 is started up.

In steps S101 and S102, when there is a transmission packet, a transmission process of the packet is performed. A core to execute the main process checks a transmission packet queue (not shown) on the RAM 13, and when a transmission packet is queued in the transmission packet queue (step S101), the core sends out the transmission packet to the network via the NIC 15 (step S102). Subsequently, the process proceeds to step S103.

In steps S103 and S104, when there is a reception packet, a reception packet process is performed. The core to execute the main process checks a reception packet queue on the RAM 13, and when a reception packet is queued in the reception packet queue (step S103), the core analyzes the reception packet (step S104). Details of the reception packet process will be described later with reference to FIG. 5. Subsequently, the process proceeds to step S105.

In steps S105 and S106, when there is a task to be processed by the core, the task is processed. The core to execute the main process checks a task queue of the core, and when a task is queued in the task queue (step S105), the core processes the task (step S106). Moreover, in the present embodiment, a reception packet process related to a request issued by another core to change a core in charge of the packet process which is performed when the change request is queued in the task queue will be described. Details of a reception packet process that is performed when a request is made from another core will be described later with reference to FIG. 6. Subsequently, the process proceeds to step S107.

In steps S107 and S108, when there is a process for which a timer is set, the process is executed. The core to execute the main process checks a current time, and when there is a task for which a timer is set (step S107), the core processes the task (step S108). Subsequently, the process returns to step S101. In other words, the process shown in the present flow chart is repetitively executed while the network monitoring device 20 is running.

Figure 5:
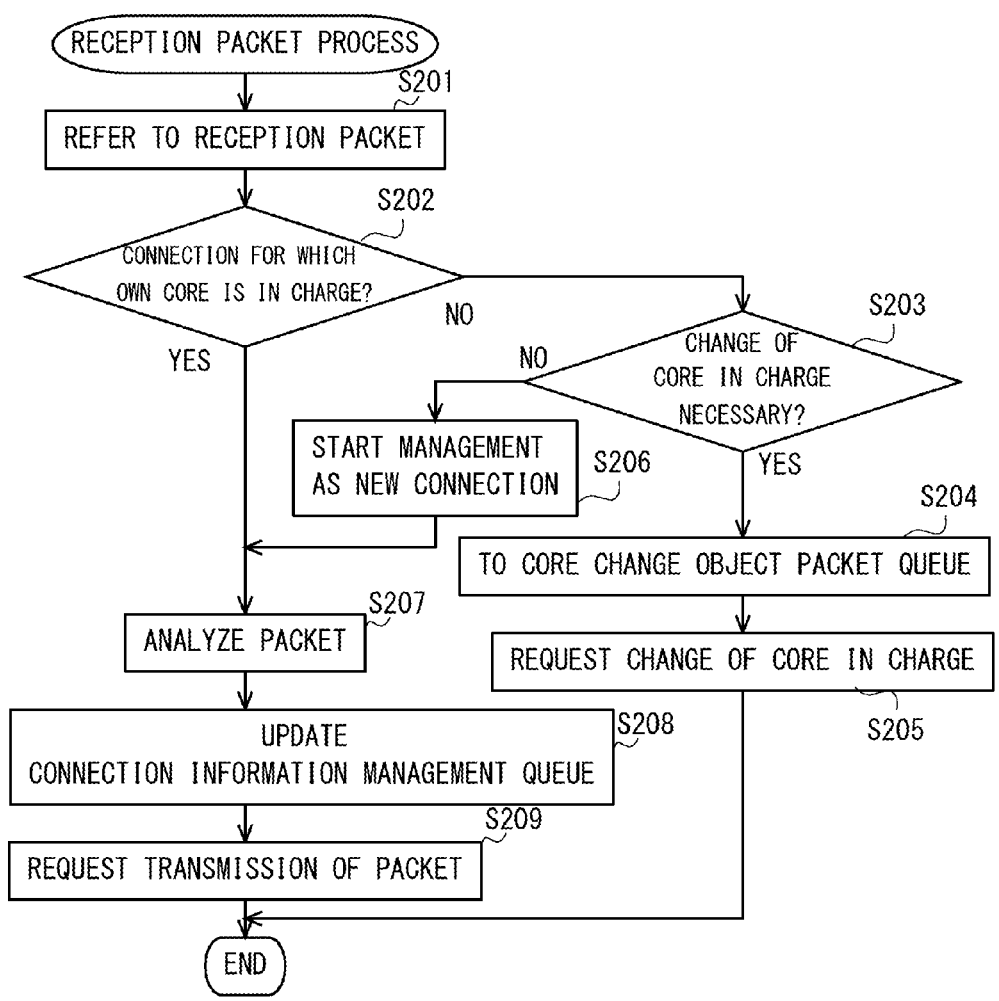
FIG. 5 is a flowchart showing an outline of a flow of a reception packet process according to an embodiment.

FIG. 5 is a flow chart showing an outline of a flow of a reception packet process that is executed by each core according to the present embodiment. As described earlier, the determining module 24, the analyzing module 25, and the request information recording module 26 are provided for each core. The reception packet process according to the present embodiment is executed each time a reception packet is distributed to a core by the core receiving the distribution (step S104 in FIG. 4). In other words, in the present embodiment, by having the determining module 24 or the like of any of the cores called each time a packet is received, a plurality of packets are simultaneously processed by a plurality of cores.

In steps S201 to S203, a reception packet is referred to and a determination is made as to whether or not the reception packet is a packet of a connection for which the core of the determining module 24 is in charge and whether or not the reception packet is a packet that requires a core change. The determining module 24 refers to an address on the RAM 13 notified by the distributing unit 22 refer to a packet distributed to its own core (step S201). In addition, the determining module 24 retrieves connection information in which same information as transmission source/destination IP addresses, transmission source/destination port numbers, and a protocol number in the packet is recorded from the connection information management queue (step S202). When an ID of a core in charge that is recorded in the retrieved connection information is an ID of its own core, the distributed packet is determined to be a packet of a connection for which its own core is in charge and the process proceeds to step S207.

On the other hand, when corresponding connection information is not retrieved or the recorded ID of the core in charge is an ID of another core, the determining module 24 determines whether or not the packet is a packet that requires a core in charge of processing to be changed (step S203).

Moreover, in the present embodiment, since the distributing unit 22 decides a core that is a distribution destination based on a 5-tuple, normally, a state where the ID of the core in charge that is recorded in the retrieved connection information is an ID of another core does not occur. In addition, specific determination criteria that are applied when determining whether or not the packet is a packet that requires a core in charge of processing to be changed are as presented earlier in the description of the determining module 24. When the packet is determined to be a packet that requires a core in charge of processing to be changed, the process proceeds to step S204. On the other hand, when the packet is not determined to be a packet that requires a core in charge of processing to be changed, the process proceeds to step S206.

In steps S204 and S205, a request to change a core in charge of processing of the reception packet is issued. By queuing an address (an address in the RAM 13) of a packet for which a determination has been made that a core in charge of processing should be changed to the core change object packet queue (which differs from the core change packet queue), the determining module 24 requests the request information recording module 26 to change the core in charge of processing of the packet (step S204).

By referring to connection information when the address of the packet is queued in the core change object packet queue, the request information recording module 26 identifies another core (change destination core) that is appropriate for analyzing the packet, queues the address of the packet to a core change packet queue that is referred to by the change destination core, and queues a change request to a task queue that is referred to by the change destination core (step S205). In other words, the network monitoring device 20 according to the present embodiment is configured to be capable of searching for a core having analyzed the communication in the past (steps S202 and S203), when there is such a core, changing a core in charge of a reception packet process (steps S204 and S205), and performing analysis using a core having performed analysis in the past.

In step S206, management as a new connection is started. The management information recording module 23 determines a packet for which corresponding connection information is not retrieved (NO in step S202) and for which a core to become a change destination of a core in charge of processing is not found (NO in step S203) to be a packet related to a new connection and registers new connection information in the connection information management queue. Subsequently, the process proceeds to step S207.

In step S207, the packet is analyzed. By referring to the address on the RAM 13 that had been notified from the distributing unit 22, the analyzing module 25 refers to a packet distributed to its own core and an analysis information table that is accessed only by its own core in order to analyze the packet. Specifically, the analysis may be performed by comparing the packet with a predefined data pattern of a protocol or with a known attack pattern. However, specific contents and methods of the analysis are not limited to the examples according to the present disclosure. In addition, the analyzing module 25 updates the analysis information table according to information obtained as a result of the analysis. Subsequently, the process proceeds to step S208.

In step S208, the connection information management queue is updated. Once the analysis of the packet is completed, the management information recording module 23 updates connection information of a connection to which the packet belongs in the connection information management queue according to information obtained as a result of the analysis. Subsequently, the process proceeds to step S209.

In step S209, a request to transmit the packet is made. The analyzing module 25 makes a request to transmit the analyzed packet by queuing an address of the packet on the RAM 13 to a transmission queue. The packet queued to the transmission queue is sent to the network in the processing (refer to FIG. 4) performed in steps S101 and S102 described earlier. Subsequently, the process shown in the present flow chart is finished.

Figure 6:
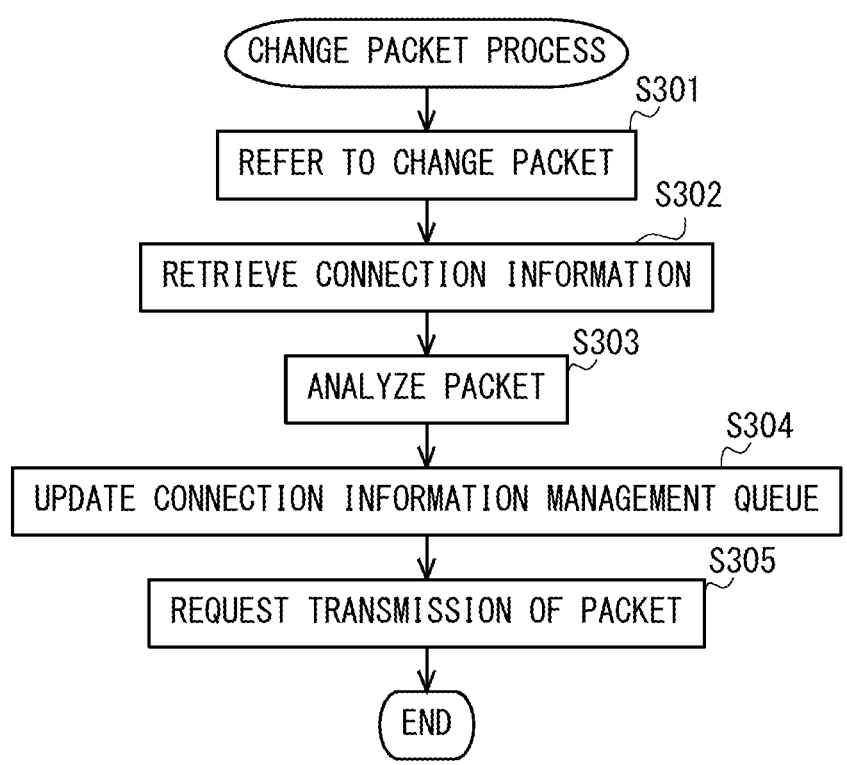
FIG. 6 is a flowchart showing an outline of a flow of a change packet process according to an embodiment.

FIG. 6 is a flow chart showing an outline of a flow of a change packet process that is executed by each core according to the present embodiment. Execution of the process shown in the present flow chart is triggered by the confirmation in step S105 of the main process of the change request that is queued to the task queue in step S205 of the reception packet process. In other words, the present flow chart presents a detailed description of the process shown in step S106 in FIG. 4.

In step S301, a change packet is referred to and corresponding connection information is acquired. Upon confirmation of a change request that is queued to a task queue, the identifying module 27 identifies a packet for which a change request has been issued to its own core by referring to an address on the RAM 13 that has been queued to a core change packet queue assigned to the core (step S301). In addition, the determining module 24 retrieves connection information in which same information as transmission source/destination IP addresses, transmission source/destination port numbers, and a protocol number in the packet is recorded from the connection information management queue (step S302). Subsequently, the process proceeds to step S303.

In step S303, a packet is analyzed. By referring to the address on the RAM 13 that has been acquired in step S302, the analyzing module 25 refers to a packet distributed to its own core and an analysis information table that is accessed only by the core in order to analyze the packet. Since a specific method of analysis and the like are similar to the contents described with reference to step S207, a description thereof will be omitted. Subsequently, the process proceeds to step S304.

In steps S304 and S305, a connection information management queue is updated and a packet transmission request is issued. Since specific contents of the updating and transmission request processes are similar to the contents described with reference to steps S208 and S209, a description thereof will be omitted. Subsequently, the process shown in the present flow chart is finished.

Example 1: Connection to Perform FTP Process

An example of a case in which a connection for FTP is processed by the network monitoring device 20 according to the present embodiment will now be described with reference to FIGS. 7 to 9.

Figure 7:
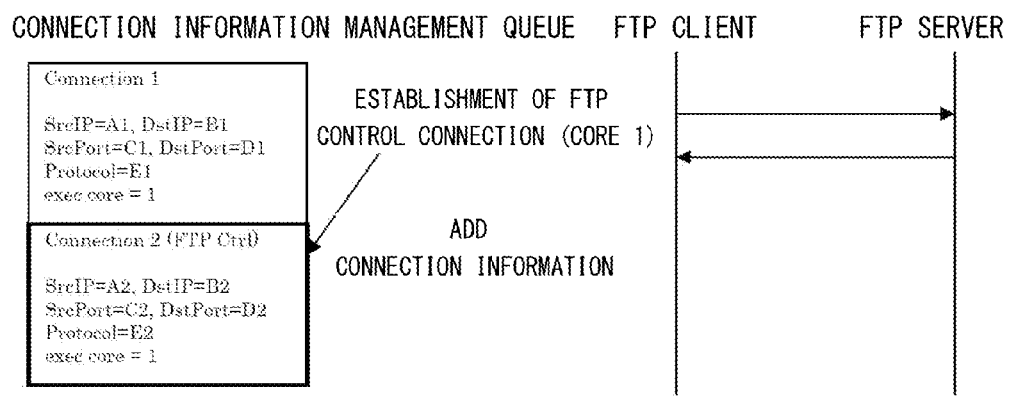
FIG. 7 is a diagram showing how a control connection of FTP is established by core 1 according to an embodiment.

FIG. 7 is a diagram showing how a control connection of FTP is established according to the present embodiment. First, when an FTP connection packet from an FTP client to an FTP server (port: 20) is acquired by the communication acquiring module 21, the distributing unit 22 distributes the packet to any of the cores (core 1 in the example shown in FIG. 7) based on a 5-tuple. In addition, the determining module 24.1 refers to a connection information management queue (exclusive control required) to confirm whether or not a core change is necessary. In this case, since a core change is not necessary, the process is handed over to the analyzing module 25.1. After being analyzed by the analyzing module 25.1, the packet is transmitted to the FTP server. At this point, connection information related to the connection is created in a connection information management queue. Subsequently, while a response packet transmitted by the FTP server to the FTP client is acquired, since the 5-tuple is the same, the distributing unit 22 distributes the response packet to core 1 and the process is performed by core 1. At this point, a control connection of FTP is established.

Figure 8:
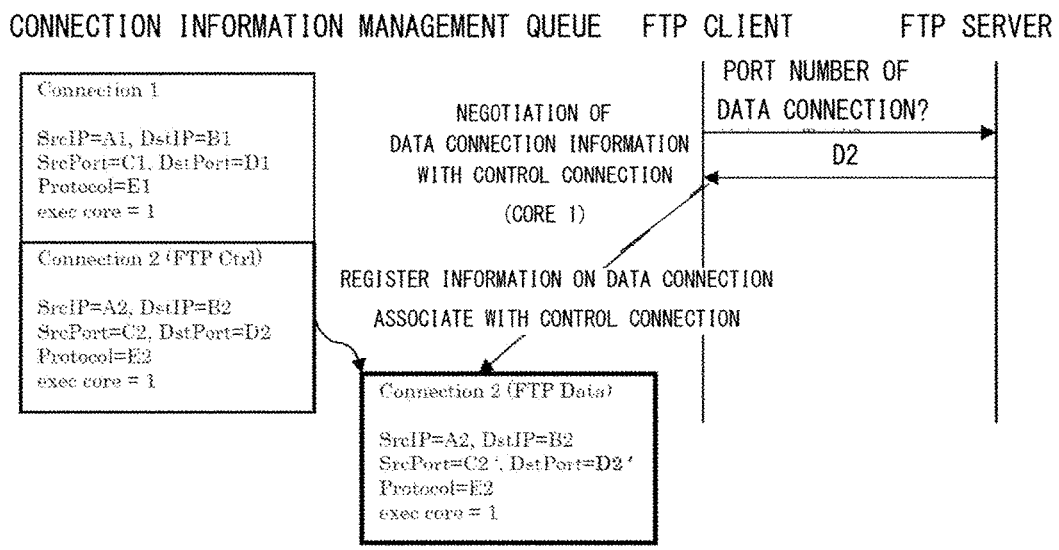
FIG. 8 is a diagram showing how a negotiation of data connection information is performed in a control connection according to an embodiment.

FIG. 8 is a diagram showing how a negotiation of data connection information (a port number for communication) is performed in a control connection according to the present embodiment. First, the FTP server receives a file acquisition request transmitted by the FTP client and establishes a data connection. In this case, the connection information management queue manages connection using a 5-tuple and further associates control connection information and data connection information of FTP with each other and stores number information and the like of the core performing the process.

Figure 9:
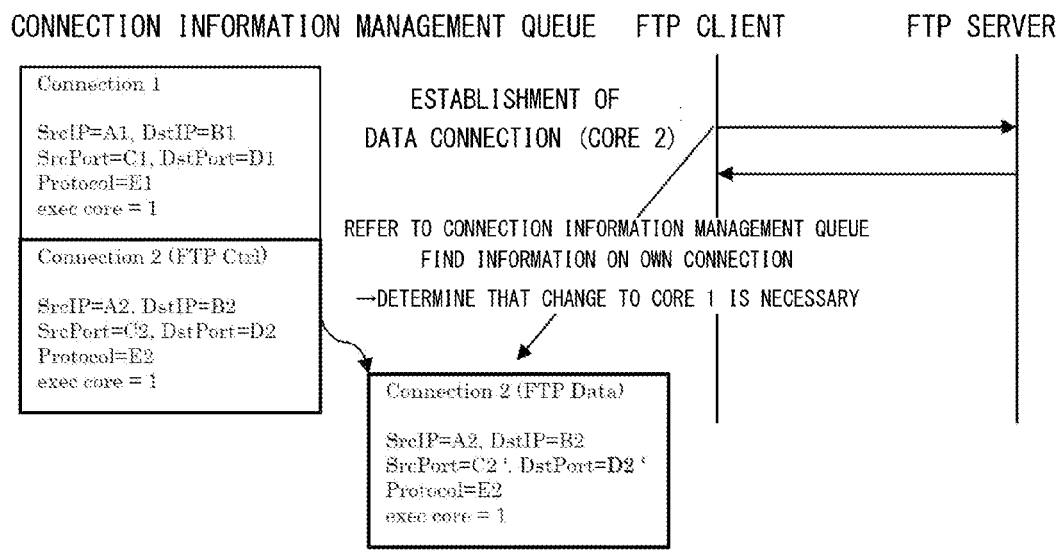
FIG. 9 is a diagram showing how a core in charge is changed when an establishment process of a data connection is distributed to core 2 according to an embodiment.

FIG. 9 is a diagram showing how a core in charge is changed when an establishment process of a data connection is distributed to core 2 according to the present embodiment. When a packet of a file is transmitted to a specified port (data connection) of the FTP client from the FTP server, the distributing unit 22 decides a core to be a distribution destination based on a 5-tuple. In this case, since a port number differs from a time point shown in FIG. 7, processing of the packet is distributed to a different core (for example, core 2). Accordingly, the determining module 24.2 refers to a connection information management queue (exclusive control required), determines that a core change is necessary, and queues a reception packet to a core change object packet queue. Subsequently, the request information recording module 26.2 collectively queues necessary packets to a core change packet queue of core 1 and further queues a change request to a task queue of core 1 (requests core 1 to change cores). Core 1 detects the presence of the change request in the task queue, acquires a core change packet from the core change packet queue of core 1 (exclusive control required) and, after analyzing the packet, transmits the packet to the FTP client.

Example 2: Connection to Perform Address Translation Process

Next, an example of a case in which a connection to perform an address translation process is performed by the network monitoring device 20 according to the present embodiment will be described. Moreover, this is an example of a case in which the network monitoring device 20 is included in a router or the like and is a device for performing address translation.

First, when a packet from a terminal (IP address: A) to a server (IP address: X) is acquired by the communication acquiring module 21, the distributing unit 22 distributes the packet to any or the cores (in this case, core 1) based on a 5-tuple. In addition, the determining module 24.1 refers to a connection information management queue (exclusive control required) to confirm whether or not a core change is necessary. In this case, since a core change is not necessary, the process is handed over to the analyzing module 25.1. After being analyzed by the analyzing module 25.1, the packet is subjected to address translation (address of the server is translated from X to y) and transmitted to the server. In this case, the connection information management queue manages connection information using the 5-tuple, further associates connection information before and after address translation with each other, and stores number information and the like of the core performing the process.

Subsequently, when a packet to the terminal (IP address: A) that is transmitted from a server (IP address: Y) is acquired, the distributing unit 22 decides a core to be a distribution destination based on the 5-tuple. In this case, since an address of the server differs from that of the packet of the previous time, processing of the packet is distributed to a different core (for example, core 2). Accordingly, the determining module 24.2 refers to a connection information management queue (exclusive control required), determines that a core change is necessary, and queues a reception packet to a core change object packet queue. Subsequently, the request information recording module 26.2 collectively queues necessary packets to a core change packet queue of core 1 and further queues a change request to a task queue of core 1 (requests core 1 to change cores). Core 1 detects the presence of the change request in the task queue, acquires a core change packet from the core change packet queue of core 1 (exclusive control required) and, after analyzing the packet, performs address translation (translation of server address from Y to X) and transmits the packet to the terminal.

VARIATIONS

In the embodiment presented above, an example is described in which, by being connected between a switch or a router and an upper-level switch or router, the network monitoring device 20 runs in an in-line mode to acquire a packet, a frame, or the like that is transmitted and/or received by the node 90 and transfer packets that need not be blocked (refer to FIG. 1). However, the network configuration presented in the embodiment described above is simply an example of implementing the present disclosure and other network configurations may be adopted to implement the present disclosure.

Figure 10:
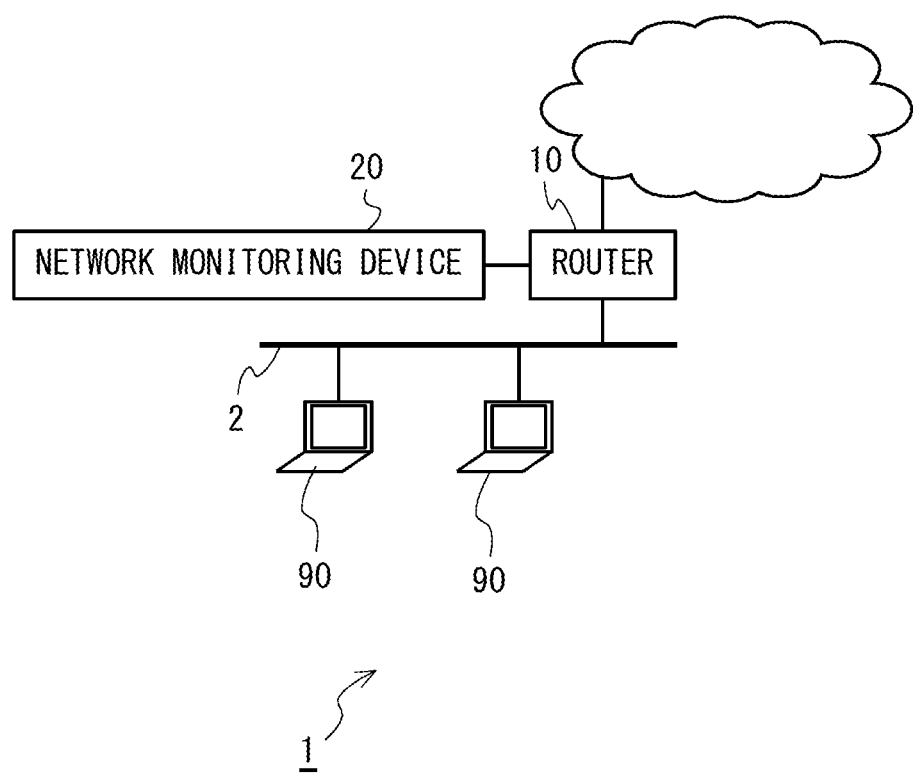
FIG. 10 is a schematic diagram showing a variation of a configuration of a system according to an embodiment.

For example, the network monitoring device 20 may acquire a packet, a frame, or the like that is transmitted and/or received by the node 90 by being connected to a monitoring port (mirror port) of a switch or a router (router 10 in the example shown in FIG. 1) (refer to FIG. 10). In this case, the network monitoring device 20 runs in a passive mode in which acquired packets are not transferred. Alternatively, for example, even if the network monitoring device 20 is not connected to a monitoring port (mirror port) and is simply connected to the network segment 2, by acquiring all frames flowing through the network segment 2 including those not addressed to the MAC address of the network monitoring device 20, the network monitoring device 20 can acquire a packet, a frame, or the like that is transmitted and/or received by the node 90. Even in this case, the network monitoring device 20 runs in a passive mode. Alternatively, for example, the network monitoring device 20 may be included in a router or a switch.

ADVANTAGEOUS EFFECTS

With the information processing device, the method, and the program according to the present embodiment, a period of time over which a shared area on a memory is locked when processing a reception packet by distributing the reception packet to a plurality of cores can be reduced. In addition, with the control according to the present embodiment, since each core can possess an analysis information table that is accessed only by the core, a packet can be processed by distributing the packet to each core without having to exclusively control an area on a memory in which analysis information is recorded.

What is claimed is:

1. An information processing device comprising:
   a plurality of processors capable of running in parallel;
   a memory shared by the plurality of processors and recorded with management information enabling a relationship to be determined, the relationship between a communication connection and a processor in charge of analysis of a packet related to the communication connection; and
   a distributor that distributes analysis of a received packet to any of the processors based on information included in the packet,
   each of the plurality of processors executes:
   determining whether or not own processor is appropriate as a processor for analyzing the packet distributed by the distributor by referring to the management information;
   analyzing the packet when it is determined that own processor is appropriate as a processor for analyzing the packet distributed by the distributor;
   recording request information for requesting another processor to perform analysis of the packet when it is determined that own processor is not appropriate as a processor for analyzing the packet distributed by the distributor; and
   specifying a packet related to request information intended for own processor by referring to the memory, wherein
   the analyzing further involves analyzing the packet specified by the specifying, and
   when management information is recorded which indicates that the packet distributed by the distributor includes a previously transmitted or received packet and that another processor had performed analysis of the included packet, the determining determines that own processor is not appropriate as a processor for analyzing the packet.

2. The information processing device according to claim 1, wherein
   when management information is recorded which indicates that another processor is to be in charge of analysis of a packet of another connection related to a connection to which the packet distributed by the distributor belongs, the determining determines that own processor is not appropriate as a processor for analyzing the packet.

3. The information processing device according to claim 2, wherein
   when management information is recorded which indicates that another processor is to be in charge of analysis of a packet of another connection in a parent-child relationship with a connection to which the packet distributed by the distributor belongs, the determining determines that own processor is not appropriate as a processor for analyzing the packet.

4. The information processing device according to claim 1, wherein
   when management information is recorded which indicates that, prior to a connection to which the packet distributed by the distributor belongs becoming an object of address translation, another processor had performed analysis of the packet of the connection, the determining determines that own processor is not appropriate as a processor for analyzing the packet.

5. The information processing device according to claim 1, wherein
the recording records the request information in a queue provided on the memory.

6. The information processing device according to claim 5, wherein
the recording records the request information in a queue referred to by another processor which is identified by referring to the management information and which is appropriate for analyzing the packet.

7. The information processing device according to claim 1, wherein
the distributor decides a processor to which the received packet is to be distributed according to a result of a hash operation performed on information including at least any of a transmission source address, a destination address, a transmission source port number, a destination port number, and a protocol number included in the received packet.

8. The information processing device according to claim 1, further comprising
a communication acquiring unit which acquires communication by a terminal connected to a network.

9. A method for an information processing device including a plurality of processors capable of running in parallel, a memory shared by the plurality of processors and recorded with management information enabling a relationship to be determined, the relationship between a communication connection and a processor in charge of analysis of a packet related to the communication connection, and a distributor that distributes analysis of a received packet to any of the processors based on information included in the packet,
the method causing each of the plurality of processors to execute:
determining whether or not own processor is appropriate as a processor for analyzing the packet distributed by the distributor by referring to the management information;
analyzing the packet when it is determined that own processor is appropriate as a processor for analyzing the packet distributed by the distributor;
recording request information for requesting another processor to perform analysis of the packet when it is determined that own processor is not appropriate as a processor for analyzing the packet distributed by the distributor; and
specifying a packet related to request information intended for own processor by referring to the memory, wherein
the packet specified in the specifying is further involved in the analyzing, and
when management information is recorded which indicates that the packet distributed by the distributor includes a previously transmitted or received packet and that another processor had performed analysis of the included packet, the determining determines that own processor is not appropriate as a processor for analyzing the packet.

10. A computer-readable non-transitory medium on which is recorded a program for an information processing device including a plurality of processors capable of running in parallel, a memory shared by the plurality of processors and recorded with management information enabling a relationship to be determined, the relationship between a communication connection and a processor in charge of analysis of a packet related to the communication connection, and a distributor that distributes analysis of a received packet to any of the processors based on information included in the packet,
the program causing each of the plurality of processors executes:
determining whether or not own processor is appropriate as a processor for analyzing the packet distributed by the distributor by referring to the management information;
analyzing the packet when it is determined that own processor is appropriate as a processor for analyzing the packet distributed by the distributor;
recording request information for requesting another processor to perform analysis of the packet when it is determined that own processor is not appropriate as a processor for analyzing the packet distributed by the distributor; and
specifying a packet related to request information intended for own processor by referring to the memory, wherein
the analyzing further involves analyzing the packet specified by the specifying, and
when management information is recorded which indicates that the packet distributed by the distributor includes a previously transmitted or received packet and that another processor had performed analysis of the included packet, the determining determines that own processor is not appropriate as a processor for analyzing the packet.

* * * * *